Patented Feb. 7, 1950

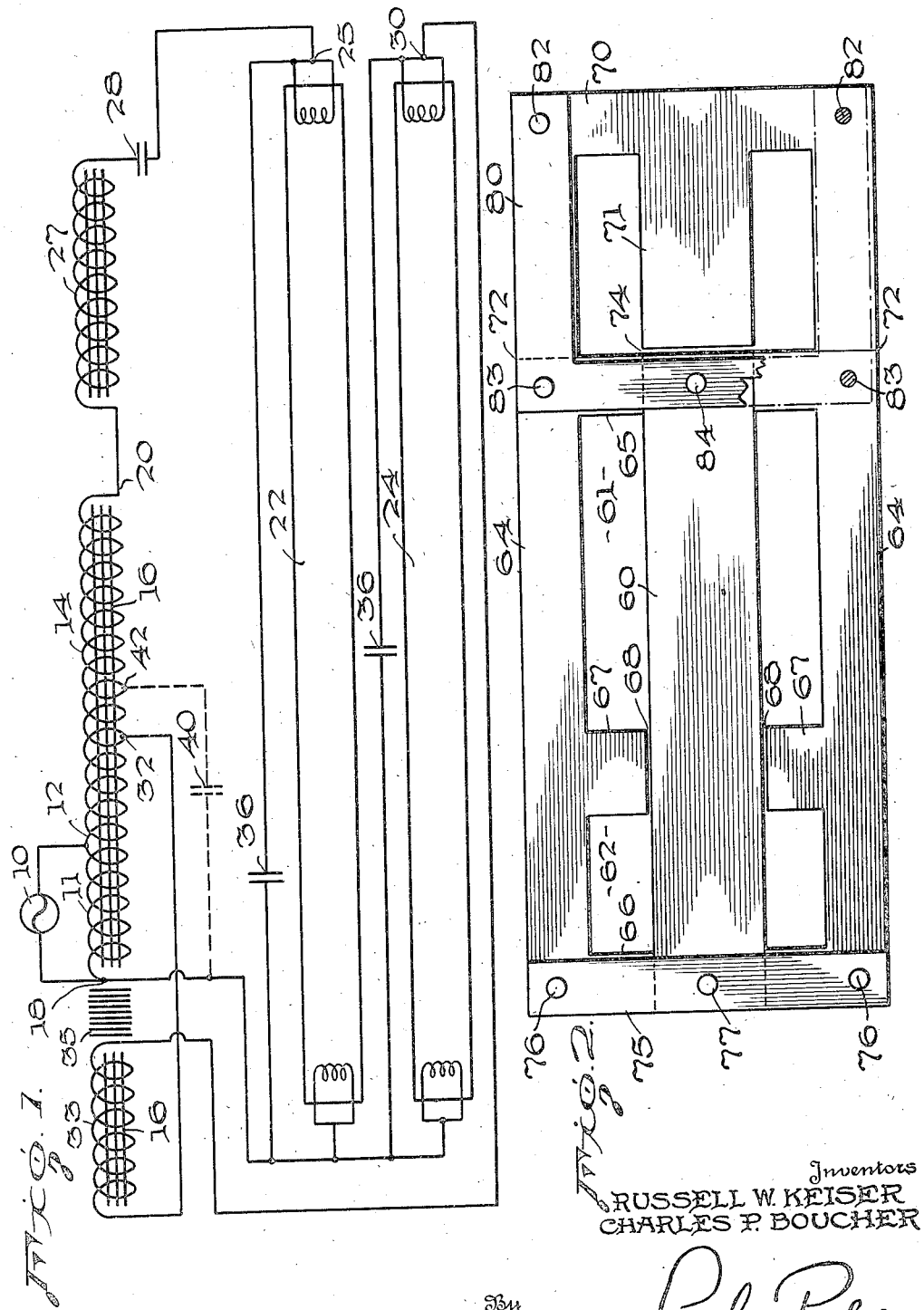

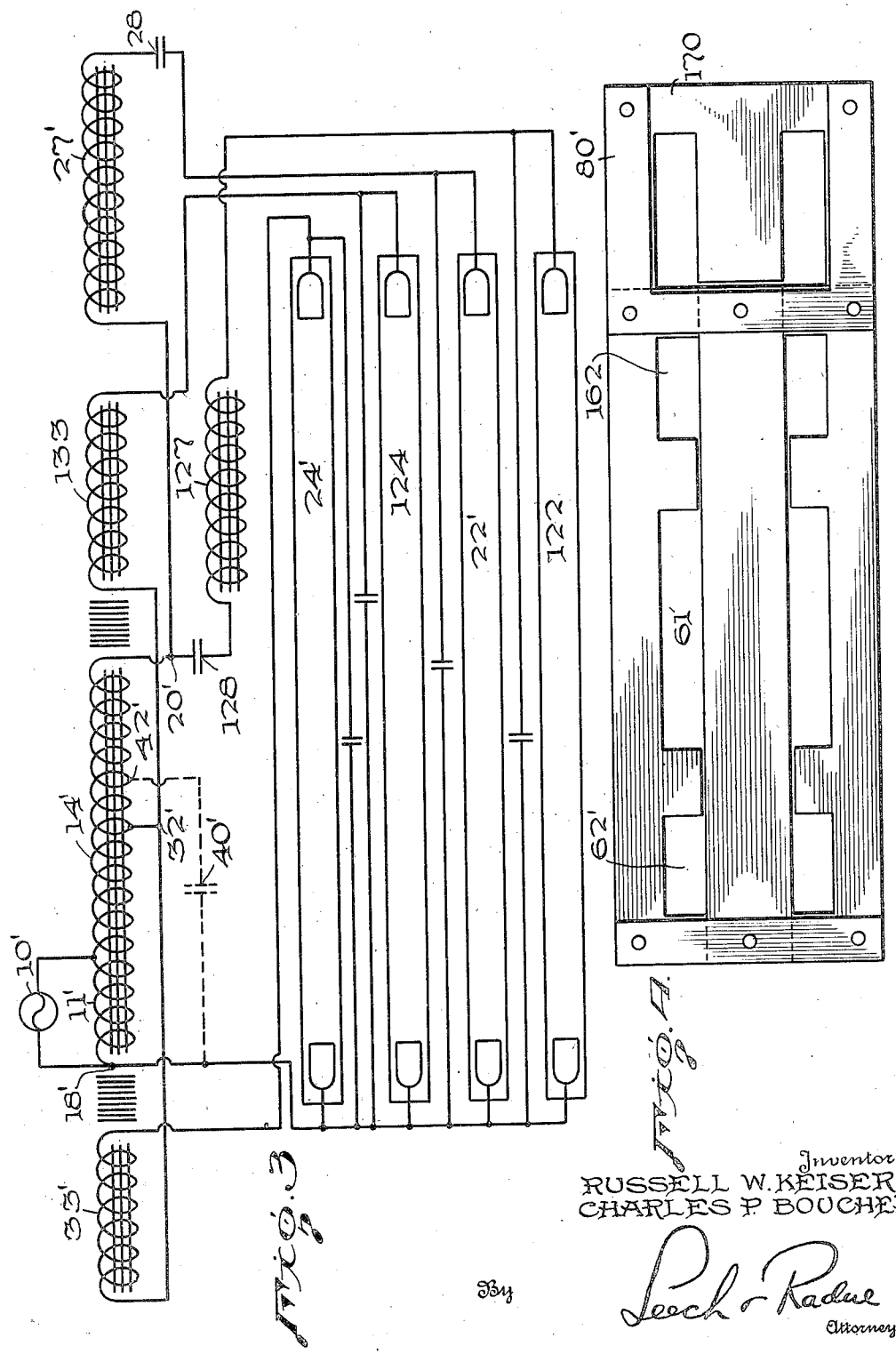

2,496,981

UNITED STATES PATENT OFFICE 2,496,981

NEGATIVE REACTANCE LAMP SYSTEM

Charles P. Boucher and Russell W. Keiser, Atlanta, Ga., assignors to Boucher and Keiser Company, Atlanta, Ga., a partnership Application April 26, 1944, Serial No. 532,827

1 Claim. (Cl. 315—138)

This invention relates to electric lamps and particularly to systems and equipment for the starting and operating of lamps of the type having negative reactance.

It is a general object of the present invention to provide novel and improved lamp systems and apparatus for use therewith.

More particularly it is an object of the invention to provide systems and apparatus for striking and operating lamps of the negative reactance type whereby maximum economy of operation and equipment is achieved.

A further object of the invention consists in the arrangement of systems and apparatus for operating two or more dephased fluorescent lamps with accepted standard efficiency by the use of diverse current controlling means resulting in a minimum use of copper and iron for handling each selected type of lamp.

More specifically the invention comprehends the operation of at least two dephased fluorescent lamps from a source of commercial alternating current by obtaining striking and operating potential for the leading lamp from an auto-transformer in series with inductive and capacitative reactors and by obtaining the current for the lagging lamp by superimposing on a portion of the auto-transformed voltage a voltage from an inductive secondary having high leakage reactance.

Important features of the invention include the desirable arrangement of the transformer with its several secondaries as a unit with the inductive reactor including the use of common core parts; the arrangement of the core structure for cool operation, long life and dependability of the whole unit at low initial cost; provision of a unit which may be sold either for instantaneous starting or for delayed hot cathode starting; and the provision of an entirely humless unit for the operation of fluorescent lamps.

Fluorescent lamps are in general operated in pairs sufficiently dephased to eliminate flicker and other undesirable effects. Since they normally require a potential for operating different from that commercially available, it is quite customary to provide some form of transformer to obtain the correct operating potential.

Fluorescent lamps have a negative reactance which means that some current retarding device must be connected in series with them to prevent the flow of excess current. This retardation can be effected by the use of a reactance in series with the lamp and one popular arrangement for operating such lamps comprises a suitable transformer, usually of the auto-connected type, and a pair of inductive reactors, one for each lamp. In addition a condenser is used in series with one reactor to provide the dephasing and incidentally to improve the power-factor characteristics.

Another popular system for operating such lamps is to combine in the transformer the effects of reactors by using either auto-connected or inductively coupled secondaries on a core arranged to provide high inductive leakage reactance. Each of these systems has its proponents and its advantages but both are more desirable in the old system where heated cathodes are used for striking the arcs in the lamps since, under these conditions, only relatively low voltages are ever necessary.

The conventional 40-watt fluorescent lamp in the usual 48-inch length requires about 450 volts for cold starting, whereas it requires less than 200 volts for normal operation at approximately .4 ampere. When instantaneous starting of such lamps is attempted with dual secondary transformers there is a decided shortening of the life of the lamps particularly where frequent startings are necessary. The results are most noticeable in connection with the lead lamps which average from 30 to 40% less life than the lag lamp when so operated. Further, when operating a pair of fluorescent lamps by a double secondary high leakage reactance transformer the lagging or inductive leg of the circuit operates a lamp very satisfactorily while the leading or capacitative leg of the same circuit provides poor wave form which heats the iron of the transformer even at normal current and secondary voltage. It also operates the lead lamp at substandard brightness. The reasons for this are quite clear when the characteristics of such a circuit are analyzed, for the leading current from the series condenser creates out of phase disturbance in the leading secondary core portion which is reflected in the primary winding by induction.

When a ballast or reactor circuit is used with two lamps it has been found that the leading reactor coil can be constructed with fewer turns of wire and less iron than the lagging reactor coil, but it is recognized that for the same operating secondary voltages and current a ballast or reactor circuit is more costly to build than a transformer circuit. It has certain advantages, however, for it affords softer striking for the lead lamp than does the transformer type of circuit and the electrode life is correspondingly lengthened. In addition when a reactor is used in series with a condenser more light is obtained from the lead lamp at the same current than is obtained from the same lamp in a leading transformer circuit.

As a result of careful tests with the several circuits it has been determined that a ballast circuit provides longer lead lamp life and slightly longer lag lamp life particularly where instantaneous or cold starting is used. Since the life of the lag lamp is not materially different either with transformer or ballast operation, it is obvious that for lamp life the ballast system is indicated. However, when designing a ballast reactor practically the same constants are used as for a transformer of the same type and size, i. e., the E. M. F. drop across the ballast coil determines the number of turns of wire required and size of air gap permissible in the core for use with the coil. The leading reactor, being in series with a capacitor of proper size, requires less turns to maintain the current at the desired operating value than is required in the corresponding lag reactor. The reactive component of the current passing through the lag lamp must be kept at a certain minimum magnitude to prevent undesirable deformation of the fundamental primary current wave form. This then determines the size of the lagging reactor.

Experiment has shown that a circuit designed to strike fluorescent lamps at 450 volts provides good regulation with a reactor that has a 420 volt drop at .4 ampere and .2 volt per turn, necessitating approximately 2,000 turns. The same desirable regulation can be obtained from the secondary of a transformer generating around 210 volts and requiring approximately 1,000 turns. It is seen therefore that an economy of copper of almost 50% with no perceptible increase of steel is available through the use of a transformer instead of a ballast.

Since the lagging lamp can be operated either by a transformer or a ballast with no perceptible difference in life, and since a reactor materially increases the life of the leading lamp, it is proposed in accordance with the present invention to operate the lagging lamp from a transformer secondary and the leading lamp from a reactor and to combine the whole into a single unit. Major economies are effected, for the leading reactor has the minimum number of turns in a ballast circuit, while the lagging lamp operated by a high leakage transformer secondary requires a minimum number of turns of winding. The system is both economical of materials and lamp life, particularly in connection with a cold starting method. It likewise gives "accepted standard efficiency" with the lowest expenditure of iron and copper. By "accepted standard efficiency" it is meant that a pair of 40-watt fluorescent lamps of standard manufacture operating dephased will deliver an average of 2000 lumens at a primary input of not more than 108 watts when arranged for instantaneous striking.

In general the novel circuit arrangement includes a core structure having wound thereon a primary winding adapted for connection to the available commercial A. C. source, an auto-connected secondary, or primary extension, for operating the leading lamp, a secondary inductively coupled to the primary and connected in series with a tap on the auto-connected secondary for operating the lagging lamp together with a non-inductively associated inductance winding for the leading lamp. A full 450 volts is desired for striking each of the lamps so that the secondary voltage from the auto-transformer is designed to produce this value at open circuit. The actual primary extension or auto-connected secondary must provide a difference in voltage between the primary volts, say 115 and 450, i. e., 335 volts. This is reduced to the appropriate operating voltage by the drop across the reactor when loaded. The inductively coupled secondary for operating the lagging lamp gives good regulation when arranged to produce 210 volts. It must therefore be supplied from a tap at the 240 volt point on the auto-connected secondary to provide the necessary 450 volts for starting. Appropriate high leakage reactance resulting from a special core structure provides for limiting the lagging lamp current during operation.

The various objects and features of the invention as enumerated above and others will be more apparent to those skilled in the art upon a consideration of the accompanying drawings and the following specification, wherein are disclosed several exemplary embodiments of the invention with the understanding that such combinations and modifications thereof may be made as to fall within the scope of the appended claim without departing from the spirit of the invention.

In said drawings:

Figure 1 is a diagrammatic and schematic illustration of a system for operating fluorescent lamps in accordance with the present invention;

Figure 2 is a plan view of the core structure of a combined transformer-reactor unit for use with the circuit of Figure 1;

Figure 3 is a view similar to Figure 1 of a system adapted for operating three or four lamps; and Figure 4 illustrates the core structure of the combined transformer and reactor unit for use in this system.

Referring now to Figure 1 which illustrates the preferred form of the invention schematically, there is shown at 10 a source of commercial alternating current of such potential as, say 115 volts connected to the primary winding 11, of appropriate number of turns, of an auto-transformer 12. This primary winding is provided with an extension or auto-connected secondary 14 wound on the same core structure 16 and adapted to provide between the points 18 and 20 the maximum voltage necessary for cold starting of the lamp 22 shown connected between these points. It is appreciated that the transformer regulation may be such that it is capable of providing this voltage at open circuit only. Lamp 22 is the leading lamp of a pair, the other or lagging lamp 24 having a different arrangement of current supply.

Interposed between the point 20 and the right hand terminal 25 of lamp 22 is the inductive reactor or ballast 27 and the capacitive reactor 28, this latter being used, as in most systems, for the dual purpose of dephasing the two lamps and improving the power factor of the whole system. The second lamp 24 has its right hand terminal 30 supplied with appropriate voltage taken from a tap 32 on the primary extension 14 and on which is superimposed the induced voltage from a secondary winding 33. This secondary 33 is shown as inductively coupled to the primary 11 and is on the same core 16.

Secondary 33 is wound with a minimum number of turns of wire to give the desired regulation and since these turns are not adequate to produce the necessary striking voltage for cold starting the lamp their voltage is augmented by tapping at 32 at an appropriate point on secondary 14. The sum of the voltages from tap 32 and secondary 33 is equal to the maximum required starting voltage for lamp 24 on open circuit.

When the lamps start, the operating voltages are reduced and the current limited for the leading lamp 22 by the normal action of the inductive reactor 27 which can have a minimum number of turns since its effect is augmented by the condenser 28. Suitable adjustment is made between the reactance of reactor 27 and that of condenser 28 to provide at least a measure of resonance in the circuit energizing the leading lamp. This provides a simple way of obtaining the same current as provided in the lag circuit with at least as good or better wave form efficiency. Normally the wave form in the lag circuit is close to a pure sine wave which provides maximum illumination in this type of lamp. A similar result is obtained for lagging lamp 24 by providing high leakage reactance for the secondary 33. This is illustrated in Figure 1 by the introduction of shunt 35 in the core structure. This shunt has no substantial effect on the provision of high open circuit voltage because of the arrangement therein of an appropriately sized air gap so that full shunting of the primary flux is prevented. However, when substantial current flow occurs the increased flux density in the core material causes leakage through the shunt so that separate magnetic circuits for the primary and secondary fluxes now carry substantially all of them and the induced voltage in the secondary is substantially reduced in magnitude. At the same time the secondary flux reacts on the primary flux to lower the inductive effect of the primary winding. By proper design of the shunt, current can be held to the desired value in the lagging lamp.

As an extra precaution against radio interference each lamp is shown shunted by a small condenser 36 which forms no part of the present invention.

This type of circuit can be extended for the operation of a third lamp by the duplication of reactor 27, the extra one being fed from the point 20 in parallel to 27. This circuit, not being of a leading nature, tends to upset the balance in the transformer. This difficulty can be to some extent corrected by the addition of such a condenser as 40 connected between the point 18 and some intermediate tap 42 on the winding of the primary extension. The use of the third lamp is not generally recommended since it is uneconomical, particularly on account of the requirement of the additional condenser.

It will be clear that the invention is independent of the exact nature of the transformer and reactor construction and core assembly but in Figure 2 there has been illustrated a preferred type of core for the purpose, primarily because of its simplicity and cheapness. Obviously it can be assembled by arranging the laminae otherwise than shown as long as the necessary magnetic circuits and air gaps are provided. The main portion of the core comprises the central leg 60 composed of an appropriate stack of laminae to provide the cross-section necessary to handle the flux required in the system. On this is assembled in the space 61 the primary and primary extension in the form of a single tapped winding or two separate windings. In the space 62 is assembled the inductive secondary. The magnetic circuits are completed by the two outer legs 64 forming a shell core. These have angled end portions 65 and 66 which abut against the sides of the central leg forming tight joints with a minimum of leakage. Dividing the spaces 61 and 62 are the inwardly projecting shunts 67 attached as shown to the outer legs but susceptible of being provided as separate elements, of being attached to the central leg or partially formed each of the central and outer legs. These shunts as shown do not extend entirely to the sides of the central leg but leave appropriate air gaps 68 for the purpose already described.

The core of the reactor 27 can be entirely independent of the transformer, in which case it will be of the usual type provided with a suitable air gap but for convenience and economy in metal, it is shown as making use of a portion of the magnetic metal of the transformer without being coupled thereto. For this purpose a stack of E-shaped laminae 70 is formed, on the central leg 71 of which the coil is wound. The top and bottom legs of the E are spaced the same as the outer leg 64 of the transformer core against which they abut at 72. The central leg is of such length that it is spaced from the similar member of the transformer by the desired air gap 74.

The core just described, being built without interlocking laminae has six butt joints and these must be held together to prevent mechanical displacement and magnetic vibration and hum. This is accomplished by using a keeper at each end on each face of the laminae stack. On the left end each keeper is a straight bar 75 overlying the outer face of the assembled end member of the core structure and being attached to the two outer legs by rivets 76 extending through the whole assembly and to the central core 60 by rivet 77. The outer core legs 64 are held with their extension 65 tightly in abutment with the central core leg 60 and the E-shaped core of the reactor is positioned tightly against the ends of the outer legs 64 by means of a C-shaped keeper 80 shown partially broken away. It is attached to the reactor core by rivets 82 passing through its ends, to the outer legs 64 by rivets 83 and to the central leg 60 by a single rivet 84.

Since the extensions 65 of the outer legs 64 are called on to carry the transformer flux as well as that of the reactor, it is proposed to make them more than half the cross-section of the central leg of either of these parts whereby the temperature of operation is materially reduced. At the same time less deformation of the leading current wave results which provides for better efficiency in the lead lamp circuit.

The air gap 74 is slightly adjustable by virtue of looseness of fit of rivets 77 and 84 and can be reduced in size by striking the left end of main core 60 with a hammer. This permits of compensation for manufacturing variations in condenser 28 for .010 inch change in the air gap will correct ±10% in condenser capacity.

In Figure 3 is illustrated a modification of the circuit of Figure 1 for operating either three or four fluorescent lamps. It has in common with Figure 1 all of the elements shown therein and bearing similar reference characters, primed, so that no explanation of this portion of the circuit is necessary. There is a slight rearrangement of the position of the lamps for convenience in illustrating the circuit, the main lead lamp 22' being shown third from the top and the main lagging lamp 24' at the top. The operation of the third lamp in the circuit, numbered 124 since it is lagging, is from the added inductively coupled secondary 133 arranged at the opposite end of the primary from the first one 33'.

A fourth lamp may or may not be combined in the system. If it is used it is positioned at 122 and operated by means of a second reactor 127 together with the condenser 128 to give it a leading characteristic. This additional reactor 127 in common with reactor 27' is connected to the last turn of the primary extension at the point 20'. The second inductively coupled secondary is likewise fed from the common tap 32' for the two secondaries.

Where only three lamps are used it will be seen that two of them are lagging or leading and under these circumstances there may be some stroboscopic flicker. Where two lamps either lagging or leading are opposed to a single lamp of the opposite characteristic stroboscopic flicker can be substantially eliminated by doubling the wattage of the single lamp.

When three lamps of equal rating are used the series condenser of the single leading lamp is not large enough to bring the power factor sufficiently close to unity for the best results, and this difficulty is rectified by connecting an additional capacitor of the proper value across some turns of the primary and primary extension. This additional condenser is illustrated at 40' connected between the point 18' at one end of the primary and the point 42' intermediate the ends of the primary extension. The number of turns of winding selected for the purpose is dependent on the voltage rating of the available condenser. Naturally those are selected which can be obtained at the lowest price and the voltage accommodated to them by properly tapping the primary extension. It is preferred to maintain the point 42' as remote as possible from point 20' consistent with economical construction.

The circuit of Figure 3 operates four lamps perfectly when they are of equal rating.

The core structure shown in Figure 4 is not substantially different from the described in connection with Figure 2 except that it provides an additional bay at 162 on the opposite side of the primary bay 61', to receive the second inductive secondary winding 133. As shown, the core is equipped with but a single reactor core 170 and which therefore provides for the operation of only three lamps. If four lamps are to be operated, as shown in Figure 3, a second reactor core similar to 170 can be abutted against the left end of the structure illustrated in this figure, but this does not provide as good phasing for the reactor cores as if the second one is merely butted against the end of the first one 170 and appropriately attached by an extension of the keeper 80'. This latter practice keeps the two cores in phase and eliminates interference with the operation of the transformer.

The several systems illustrated provide for the operation of standard fluorescent lamps by the cold starting method with "accepted standard efficiency" and using the minimum of copper and steel while at the same time giving unusual lamp life on both sides of the current.

We claim:

In a fluorescent lamp lighting system, in combination, a source of alternating current of commercial voltage, a pair of similar lamps having high initial breakdown impedance and negative impedance operating characteristics; a transformer-reactor assembly including magnetic core means, a primary winding on said core connected to said source, an auto-connected secondary winding having a turns-ratio to provide an open circuit potential sufficient to effect initial lamp impedance breakdown, a reactive winding on said core non-inductively related to the transformer windings and connected in series with said secondary winding and one of said lamps to reduce the said potential to normal for lamp operation on closed circuit, a condenser in said series circuit sized to provide an over-all power-factor approaching unity, an inductively coupled secondary on said core having minimum turns to provide good regulation serially connecting the second lamp with such a portion of the auto-connected secondary as to provide an open circuit potential sufficient to effect initial lamp impedance breakdown, said core means including a high reluctance shunt magnetically separating the inductively coupled secondary from the primary for decreasing the coupling therebetween upon the flow of current in said secondary winding whereby normal potential is provided for lamp operation.

CHARLES P. BOUCHER.
RUSSELL W. KEISER.

REFERENCES CITED

The following references are of record in the file of this patent:

UNITED STATES PATENTS

| Number | Name | Date |
| --- | --- | --- |
| 2,025,471 | Osborne | Dec. 24, 1935 |
| 2,241,261 | Horn | May 6, 1941 |
| 2,269,978 | Kronmiller | Jan. 13, 1942 |
| 2,298,935 | Freeman | Oct. 13, 1942 |
| 2,305,487 | Naster | Dec. 15, 1942 |
| 2,317,844 | Boucher and Kuhl | Apr. 27, 1943 |
| 2,317,845 | Boucher | Apr. 27, 1943 |
| 2,346,621 | Sola | Apr. 11, 1944 |
| 2,348,739 | Horn | May 16, 1944 |
| 2,352,073 | Boucher and Kuhl | June 20, 1944 |
| 2,354,879 | Ranney | Aug. 1, 1944 |
| 2,355,360 | Boucher and Noble | Aug. 8, 1944 |